United States Patent [19]

Kivolowitz et al.

[11] Patent Number: 5,077,604
[45] Date of Patent: Dec. 31, 1991

[54] COLOR PRINTING, CORRECTION, AND CONVERSION APPARATUS AND METHOD

[75] Inventors: Perry S. Kivolowitz; Aaron M. Avery, both of Madison, Wis.

[73] Assignee: ASDG Incorporated, Madison, Wis.

[21] Appl. No.: 429,171

[22] Filed: Oct. 30, 1989

[51] Int. Cl.⁵ .............................................. H04N 1/46
[52] U.S. Cl. ........................................ 358/75; 358/80
[58] Field of Search ...................... 358/75, 80, 76, 77, 358/78, 79

[56] References Cited

U.S. PATENT DOCUMENTS

| 4,482,917 | 11/1984 | Gaucke et al. | 358/80 |
| 4,656,505 | 4/1987 | Yamada et al. | 358/80 |
| 4,700,399 | 10/1987 | Yoshida | 358/80 |
| 4,701,790 | 10/1987 | Yamada | 358/80 |
| 4,731,662 | 3/1988 | Udagawa et al. | 358/80 |
| 4,831,434 | 5/1989 | Fuchsberger | 358/80 |
| 4,864,392 | 9/1989 | Sato | 358/80 |
| 4,929,978 | 5/1970 | Kanamori et al. | 358/80 |

Primary Examiner—James J. Groody
Assistant Examiner—Michael H. Lee
Attorney, Agent, or Firm—Carl E. Gulbrandsen

[57] ABSTRACT

The present disclosure describes an apparatus and method for receiving a red (R), green (G), and blue (B) color separation signal from an appropriate source such as a photo electronic scanner; acting on the RGB signal so as to convert the RGB signal to a cyan (C), magenta (M), yellow (Y), and black (K) signal in readable form for use by an appropriate four color printing device, the CMYK signal having approximately the same color ratio as the RGB signal and outputting said CMYK signal to the four color printing device such that the printed image will have approximately the same color ratio as the original RGB image.

17 Claims, 2 Drawing Sheets

COLOR PRINTING, CORRECTION, AND CONVERSION APPARATUS AND METHOD

TECHNICAL FIELD

This invention relates to the general subject matter of color image processing and, in particular, to methods of producing a full-color image using of a plurality of color inks.

BACKGROUND OF THE INVENTION

Those skilled in the art know that white light can be made from an equal mixture of the primary colors red (R), green (G), and blue (B). If one primary color is removed from white light, a complimentary color (also known as a subtractive primary or secondary color) is obtained. The subtractive primary colors are yellow (Y, i.e., white minus blue), magenta (M, i.e., white minus green), and cyan (C, i.e., white minus red). When lights of three different primary colors are seen together, a new color is produced by an additive process. But when pigments, such as printing inks, are added to white paper, the resulting colors are produced by a subtractive process.

The basic principle of color reproduction through the media of modern color printing of pictures lies in the use of only three primary colors to create the illusion of seeing, in the reproduction, the many more colors that the eye sees in the original. Pure colors are said to be saturated. Colors may be de-saturated by addition of white ink or black ink (K). The saturation of a color is an indication of how far that color is from gray. Virtually all commercial color printing processes use, in addition to the primary colors, black ink and, therefore, such processes are referred to as four-color processes.

The first step in any color reproduction system is called "color separation". More sophisticated and contemporary methods use photo electronic scanners. Photoelectronic scanning of a color image typically produces a separation of that image into red, green, and blue components which are output as RGB signals. In order to reproduce such an image in printed form, the RGB signal must be converted into a CMY signal which can be read by a suitable color printing apparatus. Theoretically, there should be a one-to-one correspondence between the primary colors of red, green, and blue to the printing inks of cyan, magenta, and yellow. This is given by the following relationship:

$$\begin{bmatrix} C \\ M \\ Y \end{bmatrix} = \begin{bmatrix} 1 \\ 1 \\ 1 \end{bmatrix} - \begin{bmatrix} R \\ G \\ B \end{bmatrix}$$

In practice, however, there exist certain deficiencies which prevent printer's inks (CMY) from producing accurate neutral gray tones. To correct for this, black (K) ink is added to assist in the reproduction of neutral tones.

Currently, most color separation systems (including classical photographic and current electrical, mechanical and computer based methods) produce the black layer of a separation by a process known as "Under Color Removal" (UCR). UCR generally defines the amount of black ink used at a particular location as a function of one of the three (CMY) ink densities. A typical function used to identify which CMY will be used in the UCR computation is:

$$f(C,M,Y) = min.(C,M,Y) \tag{1}$$

That is, UCR generally determines how much black ink to use at a particular location by first determining which of the three ink (CMY) densities is the lowest. The black density is then taken to be a fixed percentage of that lowest density.

To correct for this additional ink, some amount of ink based upon the black density value is subtracted from each of the three (CMY) color densities and the amount of colored ink used at the location of interest is adjusted accordingly. This is why the process is termed "under color removal."

Unfortunately, the UCR method perturbs the color ratios of the cyan, magenta, and yellow inks such that that ratio is different than that of the corresponding RGB colors. This is because the UCR method requires removal of an equal amount of ink from each of the three (CMY) inks. Therefore, a slightly different hue (i.e., the dominant wavelength) is obtained than what is wanted and additional color correction is required. The UCR method also applies more black ink than is necessary in the middle color density ranges; this has a tendency to dull those colors. Moreover, there is deficiency in the UCR method, in that, the black ink does not produce as deep a black as one would expect or desire. This is adjusted, under the UCR method, if the percentage of black is less than 100 percent, by further application of equal portions of the three-color inks in addition to black.

Others (See e.g. U.S. Pat. Nos. 4,700,399 and 4,803,496) have attempted to improve upon the UCR method. However, to the applicant's knowledge, no one has successfully developed a method for converting the RGB color image to four color printed image which preserves the color ratios and maintains the desired hue. The present invention provides for an apparatus and method for converting RGB images to four color printed images which overcomes the deficiencies of the prior art.

Thus, it is an objective of the present invention to convert RGB images to four color printed images while maintaining the color ratios of the original RGB image;

It is further objective of the present invention to use black ink only when necessary and to reduce the total amount of ink used in the printing process;

It is still a further objective of the present invention to reduce the number of color correction steps needed to convert an RGB image to a four color printed image, thereby reducing the complexity of the apparatus required and reducing the cost of such four color printing.

SUMMARY OF THE INVENTION

In accordance with the present invention, apparatus and method are disclosed for receiving a red (R), green (G), and blue (B) color separation signal from an appropriate source such as a photo electronic scanner; acting on said RGB signal so as to convert said RGB signal to a cyan (C), magenta (M), yellow (Y), and black (K) signal in readable form for use by an appropriate four color printing device, said CMYK signal having approximately the same color ratio as said RGB signal and outputting said CMYK signal to said four color printing device such that said printed image will have approximately the same color ratio as the original RGB image.

Numerous other advantages and features of the present invention will become readily apparent from the following detailed description of the invention, the embodiments described therein, from the claims, and from the accompanying drawings.

DETAILED DESCRIPTION OF THE PREFERRED EMBODIMENT

Figure 1:
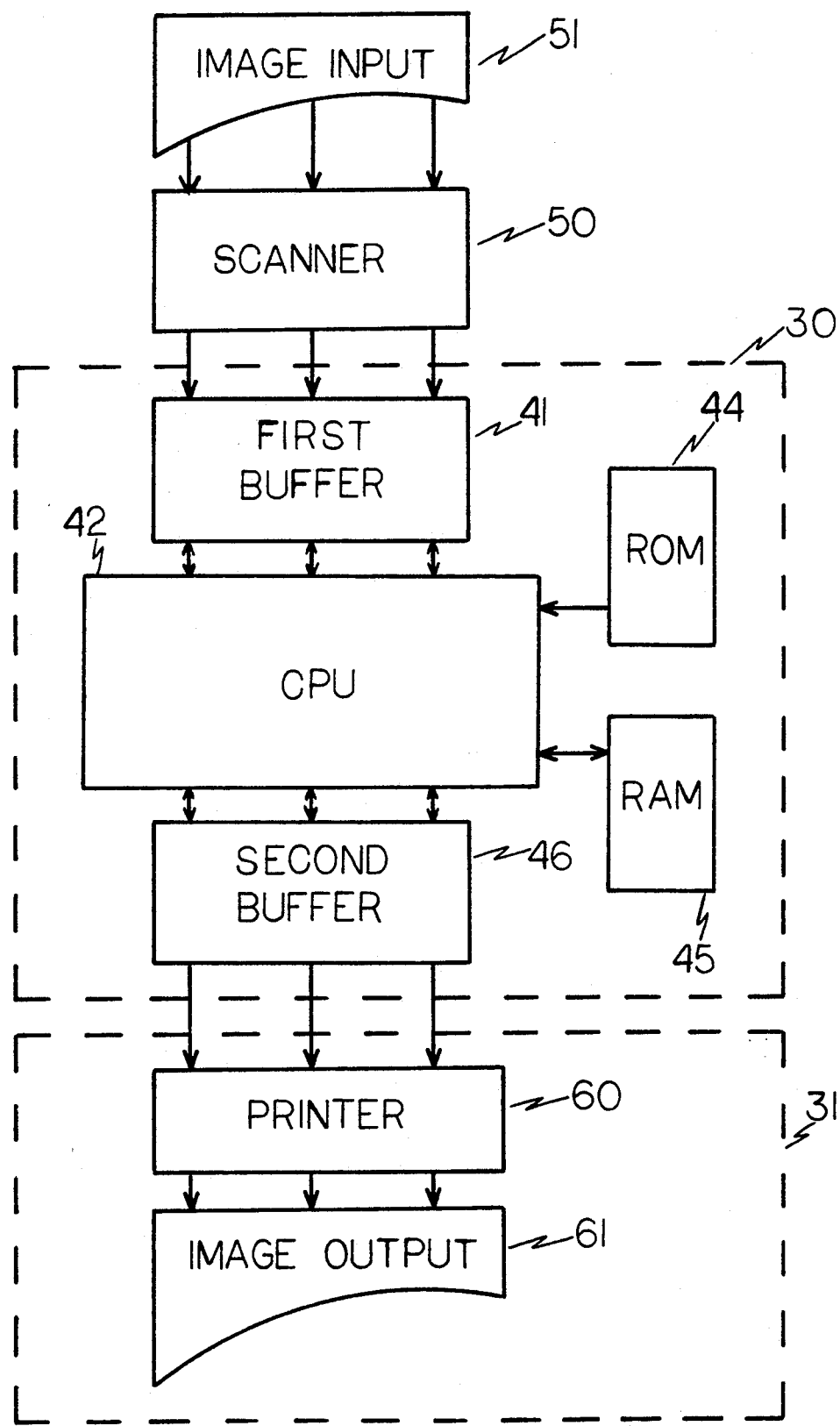
FIG. 1 is a block diagram illustrating the converting device of the present invention.

While this invention is susceptible of embodiment in many different forms, here is shown in the drawing and will herein be described in detail several specific embodiments of the invention. It should be understood, however, that the present disclosure is to be considered as an exemplification of the principles of the invention and is not intended to limit the invention to any specific embodiment.

FIG. 1 depicts by means of a block diagram the present embodiment of the converting device of the present invention. The converting device 30 may be a general purpose computer which has been modified according to the specifications of the present invention or it may be the control unit of a four color printing device in which case parts 30 and 31 would be combined.

In the present invention, the converting device 30 comprises a first buffer 41 for receiving and storing until needed RGB data of a digitized RGB color separation signal. Such signal may be produced by a photo electronic scanner 50, a color video camera or it may be generated by the converting device itself, using, for example, a color graphics design program which has been intalled in the read only memory 44 of the converting device 30.

The converting device further comprises a central processing unit (CPU) 42 which controls the overall operation of the converting device 30; a random access memory (RAM) 45 which provides work space for the CPU 42; as before mentioned, a read only memory (ROM) 44 for storing fixed information and a second buffer 46 for receiving and outputting the CMYK signal to an appropriate four color printer engine 60.

Like the UCR method, the method of the present invention contemplates the use of black (K) ink to assist in the reproduction of neutral tones. The present invention also contemplates that where black ink (K) is added, some colored (CMY) ink will necessarily be removed.

Unlike the UCR method, the present invention determines the amount of colored (CMY) ink removed by reference to the saturation of the color at a given point. This is to be contrasted with prior methods which base colored ink removal upon a value derived from one of three colored ink densities.

Figure 2:
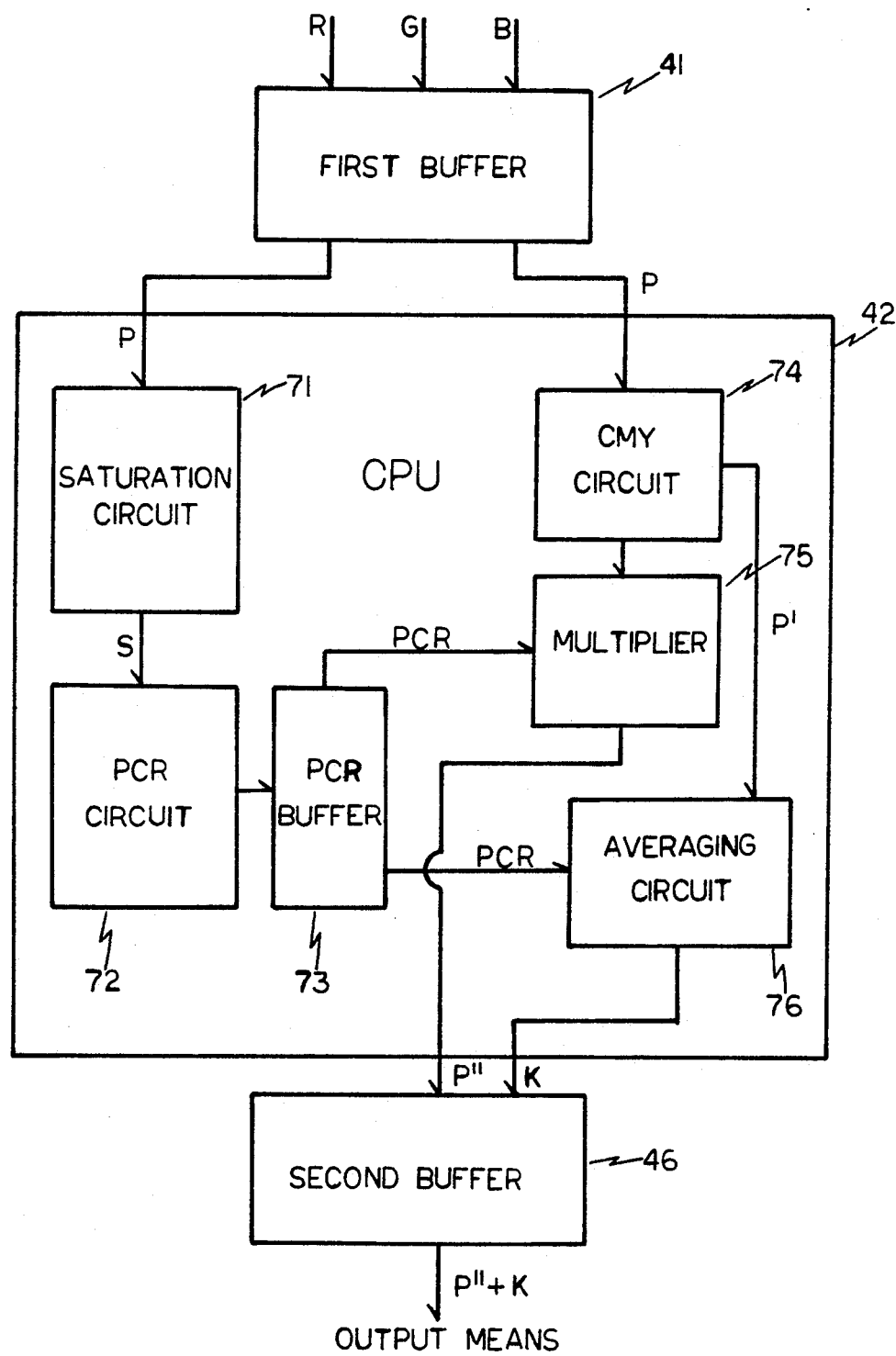
FIG. 2 is a block diagram which illustrates the circuits of the CPU of the converting device of the present invention.

Referring to FIG. 2, the RGB color separation signal is input into the first buffer of the converting device where it is stored until needed. It is customary in the art for the (R), (G) and (B) component of the color separation signal to be assigned three-tuple data points ($P_{iR}$, $P_{iG}$, $P_{iB}$, ), respectively. Each tuple represents a percentage of the component color present in the total color value at a particular location or pixel.

For purposes of this description, each member of the three-tuple has a numeric value between zero and one inclusive, and where the maximum RGB value is not equal to zero. For example, the RGB color tuple (0.30, 0.50, 0.70) means that there is 30 percent of the total possible red color present, 50 percent of the total possible green color present, and 70 percent of the total possible blue color present. In the description which follows, four data points will be considered:

| RGB Value | THREE-TUPLE | REPRESENTED COLOR |
|---|---|---|
| $P_1$ | (.20, .19, .19) | Dark near-gray |
| $P_2$ | (.89, .82, .93) | Bright near-gray |
| $P_3$ | (.10, .15, .43) | Dark highly saturated |
| $P_4$ | (.82, .93, .13) | Bright highly saturated |

FIG. 2 illustrates that the CPU 42 of the present invention is comprised of certain circuits which cooperate to convert the RGB data to CMYK data in accordance with the objectives of the present invention. These circuits can be grouped into three functional groups. The first is the saturation circuit 71 and PCR circuit 72 which cooperate to determine the Percent Color Removal (PCR). The second is the CMY circuit 74 and multiplier 75 which cooperate in utilizing the PCR value to produce the CMY print ink signal and the third is the averaging circuit 76 which utilizes the PCR value to produce the black (K) ink signal.

To illustrate specifically, the CPU 42 retrieves the RGB data points, referred to above, from the first buffer 41 and inputs these data points to the saturation computer circuit 71.

In the saturation computer circuit 71 the saturation "S" of any given RGB tuple is computed according to the following formula:

$$S = \frac{\max(RGB) - \min(RGB)}{\max(RGB)} \qquad (2)$$

Where max (RGB) and min (RGB) are the largest and smallest valued members of a RGB color value or tuple. Thus, for data points $P_1$ through $P_4$, the saturation values are:

$S_1 = (0.20 - 0.19)0.20 = 0.05$ $S_2 = (0.93 - 0.82)/0.93 = 0.12$ $S_3 = (0.43 - 0.10)/0.43 = 0.77$ $S_4 = (0.93 - 0.13)/0.93 = 0.86$

For purposes of the description, it should be noted that computations are only shown to two decimal places. In actual practice, greater precision is possible and recommended.

The output from the saturation computer circuit 71 (i.e. $S_1$, $S_2$, $S_3$, and $S_4$) are input to the PCR circuit 72 where the saturation value "S" is used to determine the percent color removal value or "PCR". In the presently preferred embodiment, the color removal value is a reverse exponential function having saturation "S" as its domain and a percentage of color ink to be removed ($PCR_i$) as its range. Preferably, the color removal value is a function of a root of "S", in general, and the fourth power of "S" in particular:

$$1 - S^{\frac{1}{4}} \qquad (3)$$

It is well known in the art of four color printing that black ink alone is not sufficient to produce a pleasing black tone. To compensate for this, when a black tone is desired, black ink is overprinted with small amounts of colored inks. Prior methods accomplish this when the UCR is less than 100 percent. In the present invention, the overprinting of black ink is implemented by an appropriate choice of the PCR function. An example of a PCR function which incorporates the overprinting of black is:

$$m(1-S^{\frac{1}{4}}) \quad (4)$$

where "m" is between zero and one. This aspect of the PCR function may be omitted. In the presently preferred embodiment, "m" is set equal to 0.67.

Specifically, for the four data points given above, the PCR valus are:

$$PCR_1 = 0.67 \, (1 - 0.05^{\frac{1}{4}}) = 0.35$$

$$PCR_2 = 0.67 \, (1 - 0.12^{\frac{1}{4}}) = 0.28$$

$$PCR_3 = 0.67 \, (1 - 0.77^{\frac{1}{4}}) = 0.04$$

$$PCR_4 = 0.67 \, (1 - 0.86^{\frac{1}{4}}) = 0.02$$

Those skilled in the art will recognize that the effect of the foregoing step recognizes that saturated colors, being far from a neutral tone, benefit far less from the addition of black ink than those colors which are closer to neutral. Prior art does not make full use of this effect.

In prior methods, (See e.g. U.S. Pat. No. 4,656,505) the amount of colored ink removed is the same for each of the colors cyan, magenta, and yellow. The effect of these prior methods in moderating the use of black resulted in perturbing the inter-relationship of the base colors resulting in a color shift or a differently perceived hue.

In accordance with the present method, the amount of colored ink removed will be a percentage of each of the cyan, magenta, and yellow present resulting in different amounts of colored ink removed for each. This preserves the inter-relationship of the base color and maintains the relative densities and perceived hue. Since the color hue is not perturbed, additional color correction steps, often required by the prior art methods, are avoided.

Having obtained a PCR value, the CPU 42 again retrieves the RGB color separation ratios "$P_i$" from the first buffer and inputs it into the CMY circuit 74. In the CMY circuit 74 "$P_i$" are converted to CMY color values by taking their inverse or their white complement using equation:

$$P_i' = 1 = P_i \quad (5)$$

Using equation (5):

$$P_1' = 1 - (0.20, 0.19, 0.19) = (0.80, 0.81, 0.81)$$

$$P_2' = 1 - (0.89, 0.82, 0.93) = (0.11, 0.18, 0.07)$$

$$P_3' = 1 - (0.10, 0.15, 0.43) = (0.90, 0.85, 0.57)$$

$$P_4' = 1 - (0.82, 0.93, 0.13) = (0.18, 0.07, 0.87)$$

These uncorrected CMY values "P" are next input to the multiplier 75. The multiplier also receives from the PCR buffer 73 the PCR value corresponding to each data point of the example. The multiplier 75 applies the PCR value to the color ink densities $P_i'$ to produce corrected values $P_i''$ of cyan, magenta, and yellow (i.e. the CMY print ink signal). This application is by means of multiplication or division depending on PCR function. For example, if PCR is "defined" as a percentage, then it is applied by multiplication. If PCR is "defined" as an inverse percentage, then it is applied by division. This equation is used:

$$P_i'' = P_i' - PCR_i * P_i' = P_i' \, (1 - PCR_i) \quad (6)$$

Specifically:

$$P_1'' = (0.80, 0.81, 0.81)(1 - 0.35) = (0.52, 0.53, 0.53)$$

$$P_2'' = (0.11, 0.18, 0.07)(1 - 0.28) = (0.08, 0.13, 0.05)$$

$$P_3'' = (0.90, 0.85, 0.57)(1 - 0.04) = (0.86, 0.82, 0.55)$$

$$P_4'' = (0.18, 0.07, 0.87)(1 - 0.02) = (0.18, 0.07, 0.85)$$

All that remains is the computation of the black component of the four-color process. In the prior art, after some amount of color ink had been removed (UCR), some amount of black ink is added. This is termed Gray Component Replacement (GCR). In those methods, the amount of GCR is computed as the function of UCR. In accordance with the present invention, GCR is a function of the amount of ink removed during the PCR step. Specifically, GCR is a function of the average of the densities removed from each of the colored inks. This function is performed in the averaging circuit 76. In particular, the average of the three members of the converted data point $P_i'$ is determined, and then the compiled data point $P_{av}'$ is multiplied by the PCR for the point. Thus, the black data or K-data for each of the four points is:

$$\begin{aligned}
K_1 &= PCR_1 * AVG(.80, .81, .81) \\
&= .35 * (.80 + .81 + .81)/3 = .28 \\
K_2 &= PCR_2 * AVG(.11, .18, .07) \\
&= .28 * (.11 + .18 + .07)/3 = .03 \\
K_3 &= PCR_3 * AVG(.90, .85, 57) \\
&= .04 * (.90 + .85 + .57)/3 = .03 \\
K_4 &= PCR_4 * AVG(.18, .07, .87) \\
&= .02 * (.18 + .07 + .87)/3 = .01
\end{aligned}$$

Having obtained the first three members of the four-color tuple $P_i''$ as well; as the appropriate K-Data, the conversion of the RGB color separation signal to the CMYK print ink signal is complete. The four-tuple for the four-color image used to represent the original RGB color values are:

(0.52, 0.53, 0.53, 0.28)

(0.08, 0.13, 0.05, 0.03)

(0.86, 0.82, 0.55, 0.03)

(0.18, 0.07, 0.85, 0.01)

Thereafter, each data point $P_i''$ may be further corrected based upon chemical compositions or impurities of the particular ink or dye used, scanner deficiencies, etc., as is now done by the art. It should be understood, however, that the present method avoids the need for other substantial color corrections which are often required by prior methods, thereby reducing the overall expense of computation. Coincident with the reduction in computational complexity (which in turn yields saving in equipment costs and processing time), the present invention results in color separations which contain vivid and rich color of high fidelity. The four-tuple data is either output directly to a suitable four color printer engine or can be stored in the second buffer 46 of the converting device 30 for later output.

Finally, the image data $P_i''$ and K is rendered onto an appropriate medium suitable for the creation of four-color printing plates or masks. The resultant printed image produced by the four color masks produced by the apparatus and process describred herein, will have approximately the same color ratio as the original RGB image.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Equivalent process steps may be substituted for those illustrated and described herein (e.g., multiplication is repeated, addition, divisions is an extension of subtraction, etc.). For example, certain features of the invention may be utilized independently of other features of the invention. Moreover, the value of "m" in equation (4) may be set to another value, or even m=1, and RGB values may be converted to CMY values before obtaining saturation values. Thus, it will be appreciated that various modifications, alternatives, variations, etc., may be made without departing from the spirit and scope of the invention as defined in the appended claims. It is, of course, intended to cover by the appended claims all such modifications as fall within the scope of the claims.

I claim:

1. In a system for producing a full color image using cyan, magenta, yellow, and black, apparatus comprising:
   (a) means for obtaining a color RGB value comprising a three-tuple where each member of said three-tuple is a percentage of color present of one of the color components red, green, and blue;
   (b) means for determining from said RGB color value a color saturation value "S" which is a function of how far said RGB color value is from saturation and for determining a color removal value which is a function of a root of "S" and is proportional to the difference between "1" and "$S^{1/n}$", where "n" is greater than "1".
   (c) a converter for converting said RGB color value to a CMY color value comprising a three-tuple where each member of said three-tuple is one of the color components cyan, magenta, and yellow; and
   (d) means for obtaining three members of a four color tuple by applying said color removal value to said members of said CMY color value.

2. The apparatus of claim 1, wherein said color removal value is of the form $m(1-S^{1/n})$ and wherein "S" has a numerical value between zero and one, "n" is greater than one, and "m" has a value between zero and one.

3. The apparatus of claim 1, further including means for using said color removal value and said CMY color value to obtain a black member of said four color tuple, and wherein said black member is obtained by using averaging means for determining an average amount of color removed from said CMY color value.

4. The apparatus of claim 3, wherein said averaging means obtains the average of said three members of said CMY color value and multiplies said average by said color removal value.

5. The apparatus of claim 4, further including printing means for obtaining a color image by printing using cyan ink, magenta ink, yellow ink and black ink in accordance with said four color tuple.

6. The apparatus of claim 1, wherein said means for obtaining said color saturation value comprises:
   (a) means for finding the member of said RGB color value three-tuple having the maximum value;
   (b) means for finding the member of said RGB color value three-tuple having the minimum value; and
   (c) means for obtaining the ratio of the difference between said maximum valued member and the minimum valued member to the value of said maximum valued member.

7. In a system for recording a full color image using black, yellow, magenta, and cyan inks, apparatus comprising:
   (a) a scanner for scanning an image to generate a color signal having color components of red, blue, and green;
   (b) computational means for determining a color saturation value which is a function of the range of said color signal components, for converting said color saturation value to a color removal percentage value "PCR" equal to $1-S_{1/n}$, where "S" represents the color saturation value and has a numerical value between zero and one and "n" is greater than one, said "PCR" for multiplying the complement of each of said color components by said color removal percentage value to obtaining CMY-data which is representative of an amount of cyan ink, magenta ink and yellow ink to be applied, and for multiplying an average of said complementary color components by said color removal percentage value to obtain K-data which is representative of an amount of black ink to be applied; and
   (c) output means for applying yellow ink, magenta ink, cyan ink and black ink in accordance with said CMY and K-data.

8. Apparatus for four color printing comprising:
   (a) means for obtaining a RGB color value comprising a three-tuple where each member of said three-tuple is a percentage of color present of one of the color components red, green, and blue;
   (b) means for obtaining a saturation value "S" which represents how far from neutral gray said RGC color values are;
   (c) means for using said S to compute a color removal percentage value "PCR";
   (d) means for converting said RGB color value to a CMY color value comprising a three-tuple where each member of said three-tuple is one of the color components cyan, magenta, and yellow;
   (e) means for multiplying said CMY color value by (1−PCR) to obtain three members of a four color tuple;
   (f) means for obtaining the black member of said four color tuple by obtaining an average of said members of said CMY color value and multiplying said average by said PCR; and (g) means for obtaining a color image by printing using cyan ink, magenta ink and yellow ink in accordance with said three members of said four color tuple and together with black ink in accordance with said black member.

9. Method of converting sets of RGB color input values to sets of CMY color output values wherein the members of each set of RGB color input values express the percentage of red, green, and blue color present and wherein the members of each set of CMY color output values indicate the percentage of cyan, magenta, and yellow ink in a printed image, comprising the steps of:

(a) determining for each set of RGB color input values, a color saturation value "S" which is a function of how far said color value is from neutral gray;

(b) determining a color removal value which is a function of said color saturation value for said set; and (c) determining for each member of said set, the difference between it and one hundred percent to obtain a three-tuple which corresponds to said set of RGB color input values and obtaining the product of each member of said three-tuple and the complement of a color removal value of said corresponding set of RGB color input values to obtain a set of CMY color output values; and (d) means for determining the Gray Component Replacement value for each of said sets of CMY color output values.

10. The method of claim 9, wherein said means for determining said Gray Component Replacement value comprises means for determining an average of said three-tuple and multiplying said average by said color removal value of said corresponding set of RGB input values.

11. The method of claim 9, wherein said image is obtained by printing with black ink in accordance with said Gray Component Replacement value in combination with printing said cyan, magenta, and yellow inks in accordance with said CMY output color values.

12. The method of claim 9, wherein said color saturation value is a function of the largest member of said set and the smallest member of said set.

13. The method of step 9, wherein said color removal value is a function of the difference between "1.0" and a root of said color saturation value.

14. The method of claim 9, wherein said color removal value is proportional to the difference between "1.0" and said color saturation value raised to the power "1/n" where "n" is greater than "1.0".

15. The method of claim 9, wherein said color saturation value is obtained by dividing the difference between the largest member and the smallest member by the largest member.

16. The method of claim 9, wherein said color removal value is calculated using the function $m(1-S^{1/n})$ where: "S" represents said color saturation value and has a numerical value between zero and one; "n" is a value greater than one; and "m" has a value between zero and one.

17. Method of converting sets of RGB color input values $P_i$ to sets of CMY color output values $P''_i$ wherein the members of $P_i$ are indicative of the percentage of red, green, and blue color present and wherein the members of $P_i$ express the percentage of cyan, magenta, and yellow ink in a printed image, comprising the steps of:

(a) means for calculating for each $P_i$ a color saturation value S by dividing the difference between the largest member and the smallest member by said largest member;

(b) means for calculating for each $P_i$ a color removal value $PCR_i$ using the formula $m(1-S^{1/n})$ where "S" and m" have numerical values between zero and one and "n" has a value greater than one;

(c) means for calculating the complement of $P_i$ to obtain a three-tuple $P'_i$ which corresponds to said set RGB color input values in terms of cyan, magenta, and yellow;

(d) means for subtracting from each member of $P'_i$ the product of $PCR_i$ and $P_i'$ to obtain a set of CMY color output values $P''_i$; and (e) means for determining an average of said members of $P'_i$ and multiplying said average by its corresponding $PCR_i$ to obtain a black ink value "K".

(f) using said values $P_i$ and K to adjust the amount of cyan, magenta, yellow and black ink used in four color printing so that the color ratio of said RGB image is maintained.

* * * * *